June 19, 1928.  1,674,250
D. E. KEECH ET AL
QUICK THROW VALVE
Filed May 2, 1927
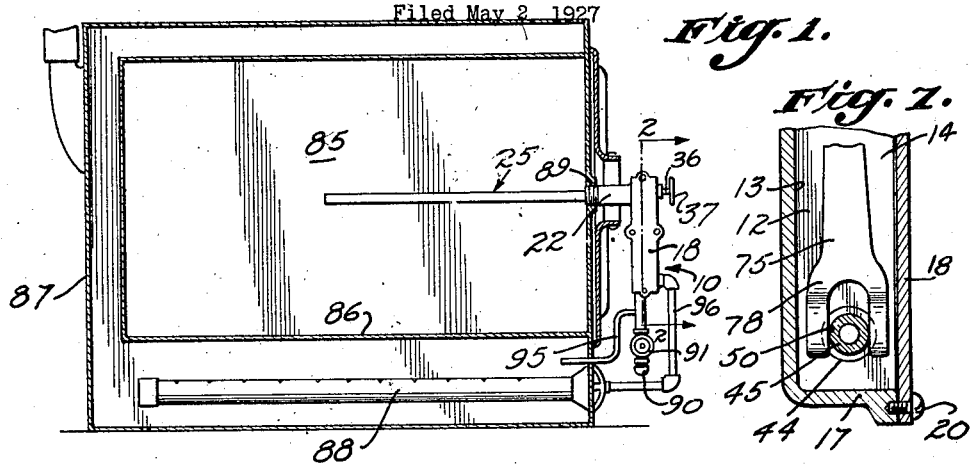
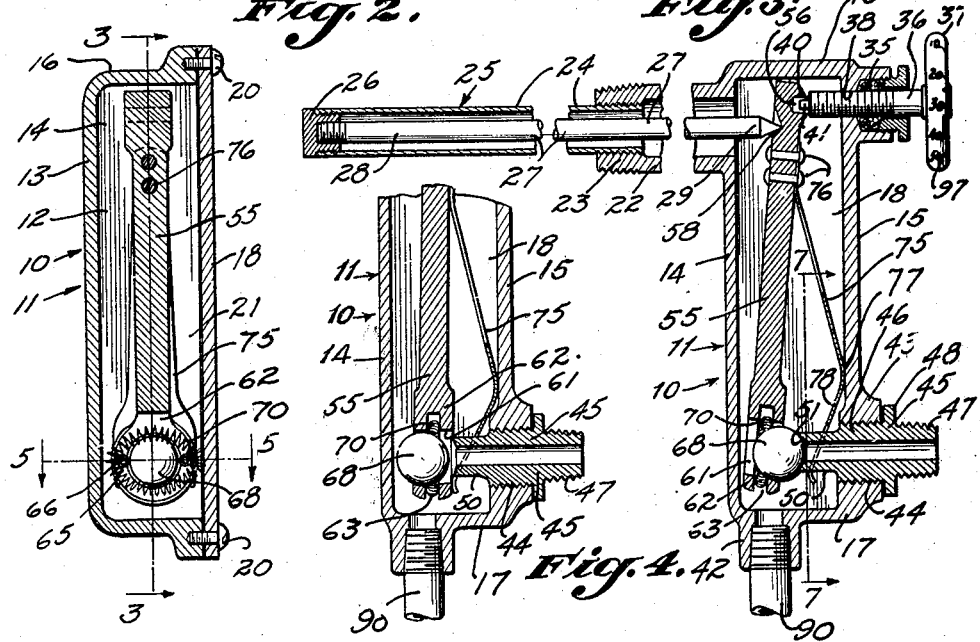
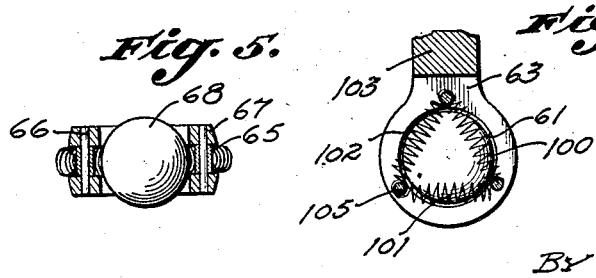
INVENTORS:
DANA E. KEECH
ALLEN P. ALGIER
BY
ATTORNEY.

Patented June 19, 1928.

1,674,250

UNITED STATES PATENT OFFICE.

DANA E. KEECH AND ALLEN P. ALGIER, OF LOS ANGELES, CALIFORNIA, ASSIGNORS TO WILLIAM B. BASTIAN, OF LOS ANGELES, CALIFORNIA.

QUICK-THROW VALVE.

Application filed May 2, 1927. Serial No. 188,269.

Our invention relates to valves such as is shown in U. S. Patent No. 1,621,866, issued to William B. Bastian on March 22, 1927, for a quick-throw valve.

It is a broad object of our invention to provide an improved quick-throw valve.

In the valve shown in said patent, a valve ball is moved on a vertical axis to and from a valve seat by a garter spring stretched around the ball. A lever is forked at one end to surround the ball and straddle the garter spring. This lever is adjustably fulcrumed at its opposite end, and a thermostatic element bears against the lever near the fulcrum to swing the lever and actuate the valve ball. The thermostatic element preferable for this purpose is of considerable length and, unless the mechanism is complicated with a motion direction changing device, necessarily extends parallel to the axis on which the valve ball moves.

In the valve shown in said patent, the valve ball is not adapted to operate properly on any but a vertical axis. This requires that the thermostat also be disposed vertically and precludes the use of such valve where it is essential that the thermostat be placed horizontally.

It is therefore another object of our invention to provide a quick-throw valve in which a valve ball is adapted to operate on a horizontal axis.

It is a still further object of our invention to provide a quick-throw valve which is adapted to operate efficiently in any desired position.

In the valve above described, it is necessary that the lever be guided so as not to bear against the valve ball and prevent its proper functioning. Means previously provided for this purpose has proven unsatisfactory due to its making a sliding contact with the lever so as to occasionally bind and prevent the operation of the lever.

A further object of our invention is to provide a quick-throw valve having a lever guide which will not interfere with the proper function of said lever.

In many uses of a quick-throw valve with a thermostat, the thermostat is set to operate the valve between a range of temperatures well above the temperature of the atmosphere. The thermostat usually applies a pressure to the valve as the temperature decreases. Thus when the apparatus in which the thermostat is used is allowed to cool down to atmospheric temperature, the thermostat tends to place an excessive pressure upon the valve mechanism.

It is a further object of my invention to provide a quick-throw valve which is adapted to yieldably resist the excessive pressure applied by the thermostat so that the valve mechanism will be protected from said pressure.

Further objects and advantages will be made manifest hereinafter.

In the drawings which illustrate a preferred embodiment of our invention, Fig. 1 is a diagrammatic view illustrating the utility of the quick-throw valve of our invention.

Fig. 2 is a vertical sectional view taken on the line 2—2 of Fig. 1.

Fig. 3 is a vertical sectional view taken on the line 3—3 of Fig. 2.

Fig. 4 is a fragmentary view similar to a portion of Fig. 3 for the illustration of the operation of the invention.

Fig. 5 is a horizontal sectional view taken on the line 5—5 of Fig. 2.

Fig. 6 is an enlarged fragmentary view similar to a portion of Fig. 2, illustrating a modified form of garter spring of our invention.

Fig. 7 is a fragmentary view of a portion of the valve actuating means.

Referring specifically to the drawings, the numeral 10 indicates the quick-throw valve of our invention. This valve has a housing shell 11 which includes a box 12 having a back wall 13, side walls 14 and 15 and top and bottom walls 16 and 17 respectively. The side of the box 12 opposite the back wall 13 is open and is adapted to be closed by a cover 18 which is held against the edges of the side walls 14 and 15 and top and bottom walls 16 and 17 by machine screws 20 so as to form a tight chamber 21 in the shell 11. A short tubular neck 22 extends horizontally from the upper portion of the wall 15, this neck terminating in the internally and externally threaded nipple 23.

Threadedly received into the internal threads of the nipple 23 is a copper tube 24 of a thermostatic element 25. The copper tube 24 extends a considerable distance outward from the nipple 23 and is provided with a plug 26 at its outer end. A steel rod 27 is disposed in the copper tube 24, one end 28 of the rod being secured to the plug 26 and the other end 29 being pointed and extending a slight distance into the housing chamber 21.

A stuffing box 35 is provided in the wall 14, the axis of the stuffing box 35 being disposed a slight distance above that of the neck 22. A threaded shaft 36 having a hand wheel 37 is threadedly received in a threaded opening 38 in the wall 14 about which the stuffing box 35 is formed. The shaft 36 has a polished radial end face 40, from the center of which projects a centering pin 41.

An internally threaded nipple 42 is provided in the wall 17 so as to communicate with the chamber 21. The wall 14 has a reinforced portion 43 at its lower end which is provided with a threaded opening 44. A valve seat nipple 45 has threaded end portions 46 and 47, the portion 46 being threadedly received in the hole 44. An annular shoulder 48 is formed between the threaded portions 46 and 47 of the nipple 45, the shoulder 48 bearing against the thickened wall portion 43 so as to form a tight seal therewith. A short tube 50 extends into the chamber 21 from the nipple 45, the tube 50 having a valve seat 51 formed at its inner end. The axis of the nipple 45 is preferably disposed substantially parallel with the axis of the thermostat 25, as will become apparent later.

A lever 55 extends substantially through the length of the chamber 21, the upper end of the lever 55 being provided with a pocket 56 which fits over the pin 41 of the shaft 36, a knife edge provided on the lever 55 then coming into contact with the radial end surface 40 of the shaft 36. When the lever 55 is thus disposed, the pointed end 29 of the thermostat rod 27 projects into a depression 58 formed in an opposite face of the lever 55 from that in which the recess 56 is formed. The face 40 of the shaft 36 forms a fulcrum for the lever 55 when the lever is swung in the direction of the arrow 60 about its fulcrum. An opening 61 provided in a head 62 formed at the opposite end of the lever 55 is adapted to extend around the tube 50. The head 62 has a slot 63 which bifurcates the head and is disposed at right angles to the axis of the opening 61.

Rollers 65 are disposed laterally on opposite sides of the opening 61 and in the slot 63. The rollers 65 are journalled upon pins 66, which are driven through suitable line holes in portions 67 of the lever head 62 which are disposed on opposite sides of the slot 63.

A valve member in the form of a ball 68 is of such diameter as to permit it to freely pass through the opening 61, and as the lever 55 swings about its fulcrum, the ball 68 is retained in the opening 61 in a position approximately opposite the valve seat 51. It is necessary, however, that the ball have a degree of lateral freedom in the opening 61. A garter spring 70 is disposed in the slot 63 so as to extend around the rollers 65 and the ball 68, the garter spring being under such tension as to exert a yieldable pressure against the ball 68 which snaps or throws the ball quickly toward or away from the valve seat 51 when the lever 55 swings about its fulcrum so as to force the garter spring over a dead center position relative to the ball.

A leaf spring 75 has an end thereof rigidly secured by rivets 76 to the upper end of the lever 55. The spring 75 extends downward and outward from the lever 55 toward the wall 14 so that a bend 77 in the spring 75 slidingly engages the inner surface of the wall 14. A foot 78 of increased width is formed upon the lower end of the spring 75 below the bend 77, the foot 78 being forked so that opposite legs 80 thereof extend beyond and engage opposite sides of the tube 50 so as to maintain the motion of the lever 55 about its fulcrum in the plane of the axis of the valve seat nipple 45. The extreme ends of the legs 80 are curved away from the lever 55, as shown.

In Fig. 1 the valve 10 of our invention is shown incorporated with an oven 85 for the purpose of controlling the temperature of the oven. The oven 85 has an oven box 86 maintained in an outer shell 87 and a gas burner 88 provided beneath the box 86 within the shell 87. The nipple 23 of the neck 22 is screwed into a reinforced opening 89 of the shell 87 so that the thermostat 25 extends horizontally into the oven 85. A gas supply pipe 90 has a control valve 91, the end of the supply pipe 90 being threadedly received into the nipple 42. Between the valve 91 and the nipple 42 a pilot tube 95 is connected to the pipe 90, the pilot pipe 95 leading to a suitable position over the burner 88. A fuel pipe 96 connects to the nipple 47 and leads to the burner 88.

A modified form of garter spring 100 is shown in Fig. 6 as comprising a plurality of spring segments 101. The number of these segments should preferably be small, there being three of these segments shown in the form illustrated. The garter spring 100 is mounted in a head 102 of a lever 103 which is identical with the head 62 of the lever 55. The spring segments 101 are disposed in the slot 63 of the head 102 in a symmetrical relation with the axis of the opening 61 formed therein. Opposite ends of the spring segments 101 are secured to pins 105 which extend through portions of the lever head 102 in a similiar manner to the pins 66 in the preferred embodiment illustrated in Fig. 5. The spring segments 101 act against the ball 68 in almost identically the same manner as the garter spring 70, excepting that each of the segments 101 is independent of the other segments and should one of these segments become weaker than the others, the ball would be forced out of its proper path in the direction of the weaker spring.

The operation of our invention is as follows:

When the thermostat 25 is at atmospheric temperature, the lever arm 55 is in the position shown in Fig. 4 so that the valve 10 is open. Therefore when the valve 91 is open, gas may flow from the pipe 90 through the valve 10 and the fuel pipe 96 into the burner 88. This condition exists when the oven 85 is first lighted, a match being applied to the burner 88 when the valve 91 is open. When the burner 88 has once been lighted, gas issuing from the pilot pipe 95 maintains a constant pilot flame until the valve 91 is again closed. The temperature of the oven 85, however, is maintained within a fixed temperature arranged by the operation of the valve 10, the gas supply valve 91 remaining open until it is desired that the oven no longer be heated.

When the burner 88 has been lighted as above described and the oven 85 becomes heated to the maximum of a desired range of temperature, the thermostat 25 operates to draw the rod 27 outward so as to release the pressure of the end 29 thereof against the lever 55. When the lever 55 is thus released, the spring 75 forces this lever from the position in which it is shown in Fig. 4 to the position in which it is shown in Fig. 3. The garter spring 70 is carried with the lever 55 to the opposite side of the ball 68 so as to quickly throw the ball 68 from the position in which it is shown in Fig. 4 to the position in which it is shown in Fig. 3. The ball 68 thus comes into contact with the seat 51 and closes the valve 10.

The supply of gas to the burner 88 through the supply pipe 96 is thus stopped and the burner 88 is extinguished. As before described, however, the pilot light formed by issuing gas from the pilot pipe 95 continues burning. As the oven cools down from the maximum to the minimum of a desired range of temperature, the rod 27 is forced inward moving the lever 55 against the pressure of the spring 75 from its position shown in Fig. 3 to the position in which it is shown in Fig. 4. The ball 68 is thus removed or thrown from the seat 51 with a quick motion when a minimum temperature has been reached in the oven 85. The valve 10 being opened, gas in supplied to the burner 88, this gas being lighted by the pilot light as it isues from the burner, heating the oven 85 to maintain this above the minimum of the desired range of temperature.

The number of degrees of temperature between maximum and minimum is determined by the relative length of the arms of the lever 55, that is, the relation of the distance between the pin 29 and the pin 41 to the distance between the pin 29 and the ball 68. This relation may be made adjustable but, in the embodiment illustrated, it is a fixed relation. The temperature which is desired to be made the minimum temperature is determined by the positioning of the fulcrum of the lever 55 by the screwing in or out of the threaded shaft 36. For the purpose of indicating to the operator of the oven 85 just what the minimum temperature will be for a given setting of the shaft 36, indicia 97 are provided upon the hand wheel 37 which, when registering with a mark on the valve shell 11, will indicate a given minimum temperature at which the oven will be maintained.

When the valve 91 is turned off so as to permit the oven 85 to cool to atmospheric temperature, the rod 27 of the thermostat 25 is projected inward a sufficient distance to exert a considerable pressure against the lever 55. If the lever 55 had a slide stop, this pressure would tend to either rupture the thermostat 25 or the lever 55. In the present invention, however, the foot 78 of the spring 75 comes into contact with the head 62 of the lever 55 when the lever is forced a given distance in the direction of the arrow 60 so as to cushion a further movement of the lever 55 in this direction.

Attention is called to the fact that even though the valve 10 is disposed so that the lever 55 extends vertically, the weight of the ball 68 will operate upon the proper path which extends substantially along the axis of the valve seat tube 50. Thus the valve 10 will operate successfully no matter in what position it may be necessary that it be placed. The main advantage of the mounting of the garter spring 70 about the rollers 65 is that if any portion of the spring 70 should stretch more than the rest of the spring, this stretch would be communicated about the rollers 65 to the rest of the spring so that the spring would still exert an equal pressure upon opposite sides of the ball 68 so as to continue to actuate the ball 68 along the path necessary for it to make a perfect contact with the valve seat 51. The garter spring 70 is definitely positioned upon the lever 55 by its being stretched around the rollers 65. Thus, if the lever 55 is in a vertical or other non-horizontal position, the ball 68 tends to fall out of the path over which it must move in order to properly seat. For this to happen, however, would require the garter spring to be distorted more in one direction from this path than in another. Owing to the tension placed upon the garter spring 70, this unsymmetrical distortion is never possible to more than a very slight extent so that movement of the ball 68 from its proper path is practically prevented.

We claim as our invention:

1. In a quick-throw valve, the combination of: an actuating member; a valve member, outer surfaces of which converge away from a transverse plane passing therethrough; yieldable means adapted to be moved over a given path by said actuating member to act upon said converging surfaces to throw said valve member along said path; and means for restraining movement of said yieldable means in a direction transverse relative to said path to cause said yieldable means to support a portion of the weight of said valve member.

2. In a quick-throw valve, the combination of: an actuating member; a valve member, outer surfaces of which converge; yieldable means movable by said actuating member to act upon said converging surfaces to throw said valve member along a given path; and means for holding said yieldable means relative to said actuating member so as to center said valve member relative to said path.

3. In a quick-throw valve, the combination of: an actuating member; a ball; yieldable means movable by said actuating member to act upon said ball to throw said ball along a given path; and means for holding said yieldable means relative to said actuating member so as to center said ball relative to said path.

4. In a quick-throw valve, the combination of: an actuating member; a valve member, outer surfaces of which converge; a garter spring movable by said actuating member to act upon said converging surfaces to throw said valve member along a given path; and means for holding said garter spring relative to said actuating member so as to center said valve member relative to said path.

5. In a quick-throw valve, the combination of: an actuating member; a ball; a garter spring movable by said actuating member to act upon said ball to throw said ball along a given path; and means for holding said garter spring relative to said actuating member so as to center said ball relative to said path.

6. In a quick-throw valve, the combination of: an actuating member; a valve member, outer surfaces of which converge; a resilient member adapted to be moved by said actuating member to act upon said converging surfaces to throw said valve member along a given path, said actuating member engaging said resilient member to move it along said path and to restrict its expansion to a plane transverse relative to said path; and means associated with said actuating member to restrain said resilient member so as to substantially center said valve member relative to said path.

7. In a quick-throw valve, the combination of: an actuating member; a valve member, outer surfaces of which converge; a garter spring adapted to be moved by said actuating member to act upon said converging surfaces to throw said valve member along a given path, said actuating member engaging said garter spring to move it along said path and to restrict its expansion to a plane transverse relative to said path; and means associated with said actuating member to restrain said garter spring so as to substantially center said valve member relative to said path.

8. In a quick-throw valve, the combination of: an actuating member; a valve member, outer surfaces of which converge; a resilient member adapted to be moved by said actuating member to act upon said converging surfaces to throw said valve member along a given path, said actuating member engaging said resilient member to move it along said path and to restrict its expansion to a plane transverse relative to said path; and rollers associated with said actuating member to restrain said resilient member so as to substantially center said valve member relative to said path.

9. In a quick-throw valve, the combination of: an actuating member; a valve member, outer surfaces of which converge; a garter spring adapted to be moved by said actuating member to act upon said converging surfaces to throw said valve member along a given path, said actuating member engaging said garter spring to move it along said path and to restrict its expansion to a plane transverse relative to said path; and rollers associated with said actuating member to restrain said garter spring so as to substantially center said valve member relative to said path.

In testimony whereof, we have hereunto set our hands at Los Angeles, California, this 27th day of April, 1927.

DANA E. KEECH.
ALLEN P. ALGIER.